F. O. COOLEY & A. J. MILLIGAN.
AUTOMOBILE JACK.
APPLICATION FILED APR. 17, 1916.
1,203,494.
Patented Oct. 31, 1916.
2 SHEETS—SHEET 1.
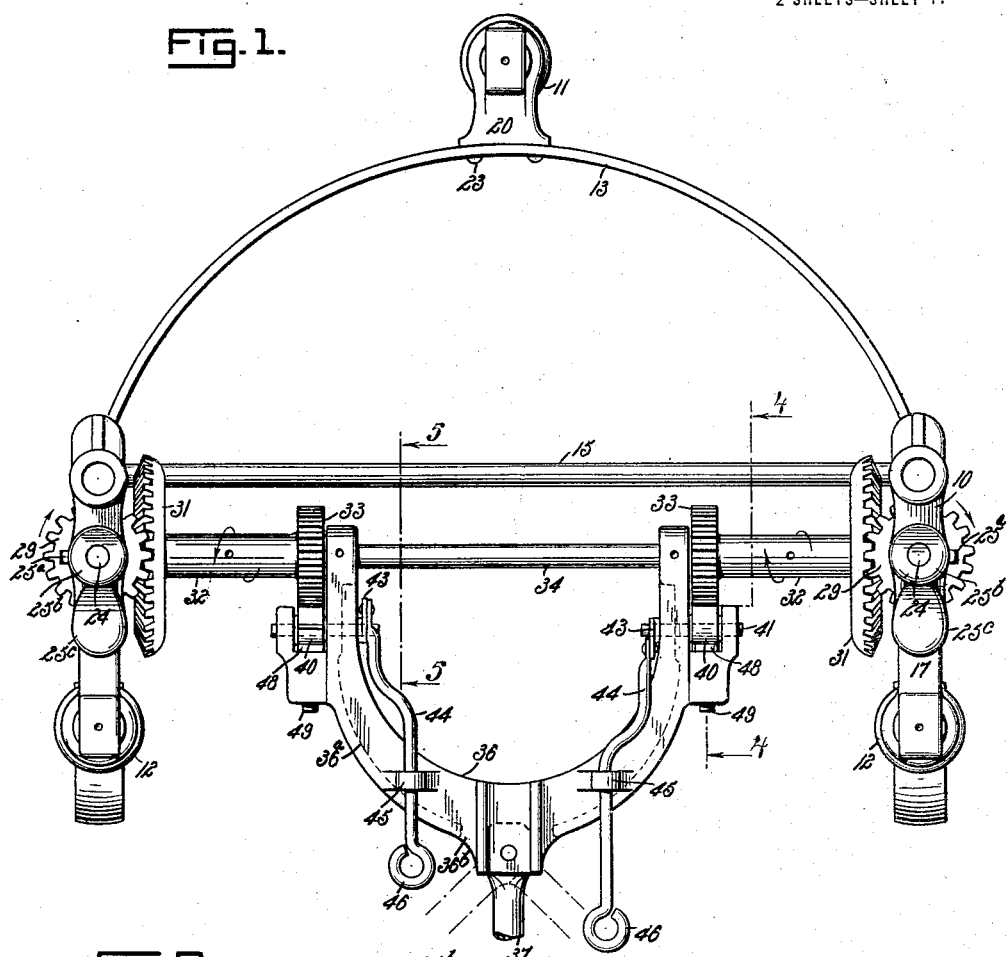
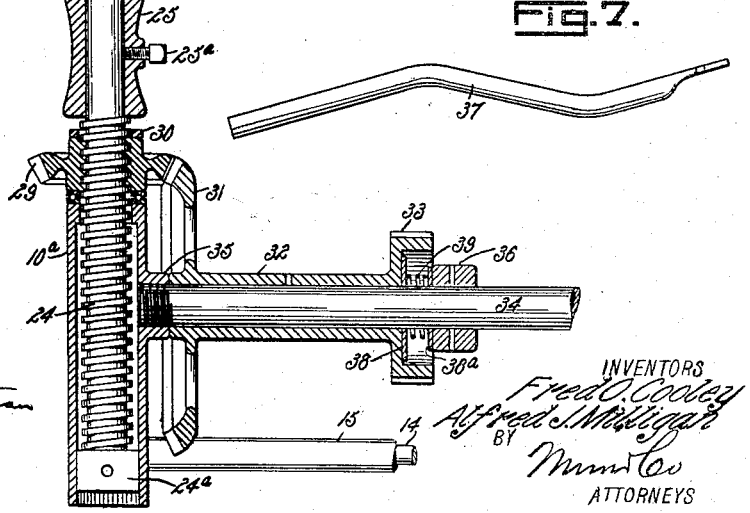

F. O. COOLEY & A. J. MILLIGAN.
AUTOMOBILE JACK.
APPLICATION FILED APR. 17, 1916.
1,203,494.
Patented Oct. 31, 1916.
2 SHEETS—SHEET 2.
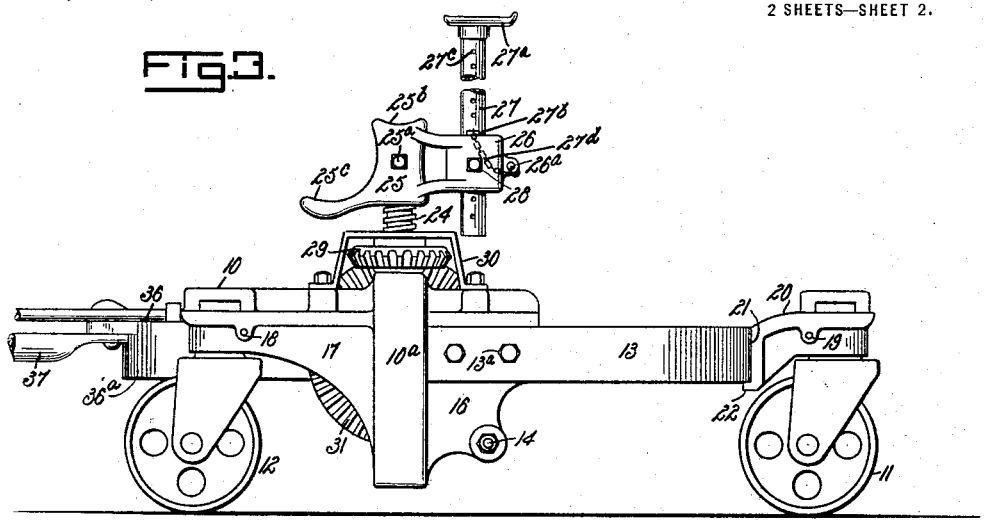
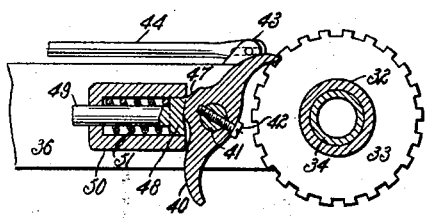
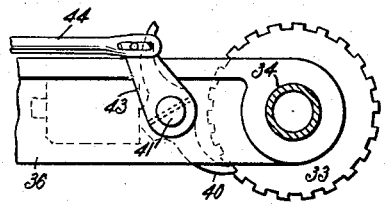
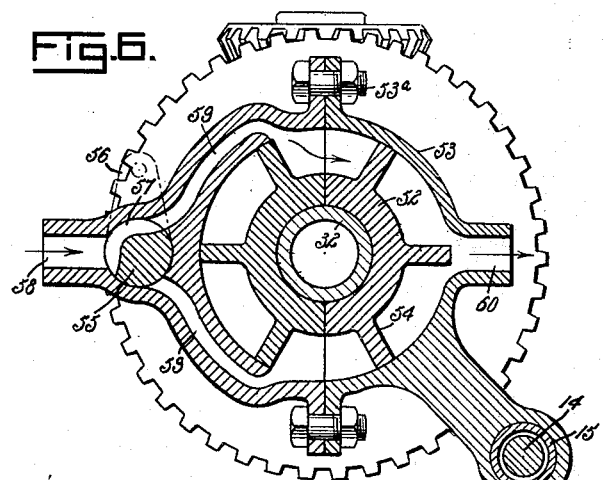
WITNESSES
INVENTORS
Fred O. Cooley
Alfred J. Milligan
BY
ATTORNEYS

UNITED STATES PATENT OFFICE.

FRED ORLANDO COOLEY AND ALFRED JAMES MILLIGAN, OF DULUTH, MINNESOTA.

AUTOMOBILE-JACK.

1,203,494.     Specification of Letters Patent.     Patented Oct. 31, 1916.

Application filed April 17, 1916. Serial No. 91,600.

*To all whom it may concern:*

Be it known that we, FRED O. COOLEY and ALFRED J. MILLIGAN, both citizens of the United States, and residents of Duluth, in the county of St. Louis and State of Minnesota, have invented a new and Improved Automobile-Jack, of which the following is a full, clear, and exact description.

An object of our invention is to provide an automobile jack of a character to be reliable, convenient and efficient when used not only as a lifting jack, but as a turntable, a transport, a tire rest, means for use in testing the emergency brake, and otherwise serviceable in the cleaning of wheels, as well as attending to repairs of axles, springs, tires, wheels, gearing, and other parts.

A further object of the invention is to provide a jack of the class referred to having two thrust screws at the sides, both either right or left screws, together with lever-operated means for said screws, of a character to exert the full force whether in lifting or lowering the load, and by which the screws may be operated simultaneously in the same direction or in opposite directions, and in which the raising or lowering at either side may be arrested at any time.

A further object of the invention is to provide a jack of the indicated class having screw caps or heads of a character to clear the truss and steering rod of the automobile, and an extension element, whereby to provide for varying the range of operation both with respect to height and width.

A further object of the invention is to provide a jack of the indicated class in which the operating lever for actuating the screws at both sides may be operated from either side of its axis and enable the jack to be variously positioned with respect to the automobile either transversely of the automobile or longitudinally with the latter at either side thereof and at all times provide a sufficient base area for the jack pedestal.

The invention also has for an object to improve jacks of the indicated class in various particulars to give increased strength with simplicity of construction, as well as stability to insure against tilting of the load, and convenience of adjustment and control of operation.

Reference is to be had to the accompanying drawings forming a part of this specification in which similar reference characters indicate corresponding parts in all the views.

Figure 1 is a plan view of a jack embodying our invention; Fig. 2 is a fragmentary transverse vertical section of one side of the jack; Fig. 3 is a side elevation; Fig. 4 is a vertical section on the line 4—4, Fig. 1; Fig. 5 is a similar section on the line 5—5, Fig. 1; Fig. 6 is a detail in cross section showing a fluid-driven means for actuating the jacks; Fig. 7 is a side view of the operating lever.

In carrying out our invention, a pedestal is provided, designated generally by the numeral 10 and generally bowed as viewed in plan. A caster wheel 11 is provided at the center, at the front of the pedestal, and at the rear of the pedestal, at each side, caster wheels 12 are provided. The forward end is formed by a bowed member which may consist of a flat bar 13 vertically disposed. The rear ends of said bar are fastened to forwardly extending side flanges or bracket members 16 by bolts 13$^a$, or the like, and said flanges 16 are braced transversely by a rod 14 (Figs. 2 and 3), and a spacing sleeve 15.

The rear wheels 12 are mounted on rearwardly extending bracket members 17, through which transverse pins 18 extend to engage in the usual annular grooves (not shown), in the spindles of the caster wheels. The front wheel 11 is held by a transverse pin 19 engaging in the usual groove of the caster spindle. The spindle is received in a bracket 20 which has a vertical face 21 in the rear side thereof presenting a foot or ledge 22 at the bottom on which the bar 13 rests, said bar being fastened, in the example shown, to the bracket 20 by screws 23, or the like.

At each side thrust screws 24 are provided and operate in housing 10$^a$ of the pedestal, the lower ends 24$^a$ of the screws being squared to prevent their turning in the housings. At the upper end each screw is fitted with a cap or head 25 which may be turned to various angular positions and secured by set screws 25$^a$. Each head is provided at the top with a seat or rest 25$^b$ directly in line with the screw 24, and in addition, a lateral foot 25$^c$ is provided on the head, thereby providing for engagement with the part to be lifted either by means of the seat 25$^b$ or the foot 25$^c$, enabling the trusses, etc., to be cleared.

To provide for a body engagement of the jack and to vary the range both as to width and height, each head 25 has a bracket 26 which receives vertically movable post 27, having a suitable head 27ª. Set screws 28 may be employed to hold the posts 27 against turning. A pin 27ᵇ is adapted to be inserted in any one of a series of pin holes 27ᶜ in each post 27 and rest on bracket 26. The pin 27ᵇ may be carried by a chain 27ᵈ secured to an ear 26ª of bracket 26. The posts 27 and caps 27ª serve for lifting the body to remove axles, or for any other purpose.

The operating gearing, for the screws 24, includes a bevel pinion 29, threaded on each screw and resting on the housing 10ª. The pinions 29 may be held in position by straps 30 or equivalent members provided on the pedestal for the purpose. The pinions 29 are in mesh with beveled gear wheels 31 formed upon or secured to sleeves 32 at the opposite ends of which operating pinions 33 are provided. The sleeves 32 turn on a tubular or other rod 34, which, in the present example, has its ends threaded into nipples 35 on the housings 10ª.

A yoke 36 having a vertical flange 36ª is hung on the rod 34 between the respective drive pinions 33 and to said yoke is pivoted an operating handle 37, which extends into a cut-away 36ᵇ of flange 36ª. The lever handle 37 may thus be swung through an angle to either side as indicated in dotted lines, Fig. 1. Between the arms of the yoke 36 and the pinions 33, friction devices are employed which may consist each of a bearing plate 38, disposed against the adjacent face of the pinion which is recessed to receive said plate and to receive a coil spring 39 which abuts at its outer end against a wear-plate 38ª, disposed against the yoke 36.

On the yoke 36, pawls 40 are provided to engage and actuate the pinions 33. Each pawl is mounted on a transverse pin 41, the pawl being secured to the pin by a screw 42 to turn with the pin. The pawl is two-armed so as to engage with a pinion 33 either at the top or bottom to turn the pinion in either direction, as best seen in Fig. 4. The pins 41 are rockably mounted in the yoke 36 and are provided with crank arms 43, to which operating rods 44 are connected, said rods having guided longitudinal movement on keepers 45 on the yoke 36 and being provided with suitable handles 46, for rocking the pawls to engage either arm of the respective pinions. In order to maintain the pawls in a given position, each of said pawls is formed with faces 47 at an angle to each other and adapted to bear against the head 48 of a stem 49, which has guided movement in a housing 50 on the yoke 36, there being a compression spring 51 encircling the said stem within said housing 50 and bearing at one end against said housing and at its forward end against the head 48 to hold the same yieldingly against the presented face 47 of the pawl 40.

The screws 24 are alike, that is to say, they are both either right-hand or left-hand screws and in operation the pawls 40 may be readily disposed as will be obvious to engage the pinions 33 either above or below. Both pawls may be made to engage the pinions at the bottom or top, or one pawl may be engaged at the top of the pinion 33 while the other engages its pinion at the bottom, or if desired, one pawl may be thrown to a neutral position, for which purpose the heads 48 are formed with the faces thereof having a depression corresponding with the angular formation produced by the faces 47 of the pawl. The yoke 36 and handle 37 constitute the operating lever, and the operation, it will be observed, is by alternate movements of the lever, that is to say, a pinion 33 will be operated only by one stroke of the lever. As the full power of the lever is thus applied on the alternate strokes of the lever, the power exerted on the screw permits of employing a comparatively large pinion 31 for speed.

It will be clear that both screws may be operated simultaneously or either screw, or the screw at one side may be lowered as the other is raised, and the movement of either may be arrested at any time. It will be clear also from an inspection of Fig. 1, that the operating lever may be thrown to the opposite side of its axis from that shown in said figure, that is to say, to be disposed over the bowed front bar 13. In the latter case the throw of the lever is somewhat limited but the arrangement provides for disposing the jack transversely beneath the automobile or disposed at either side of the automobile with the axis of the yoke 36, and therefore, the axis of the lever, disposed for engaging the screw caps, or their extensions against the body or frame of the car. With the jack thus disposed in the latter position and outside of the automobile, the load is distributed over an ample wheel base.

The described construction provides for properly positioning the jack beneath the car or car parts according to the work to be done on the car or for the transport or turning of the car.

In Fig. 6 is shown an application of a fluid-operated means to turn the sleeves 32. In said figure, a rotor 52 is formed in two sections and clamped in position on the sleeve to turn within a stator 53 which is formed in flanged sections secured by bolts 53ª or the like. The rotor 52 has radial piston arms 54, and an inlet valve 55 is provided to be operated in any suitable manner as by a clamp arm 56 indicated in dotted lines, said valve having an arcuate passage 57 adapted to communicate with the fluid inlet 58 for directing the motive fluid to either of two passages 59 in the stator 53, the fluid finally passing to the exhaust 60.

The bent form of the lever handle as shown in Fig. 7 provides clearance for the movement of the lever for the maximum throw of the pawls.

Having thus described our invention we claim as new, and desire to secure by Letters Patent:

1. In an automobile jack, a pedestal comprising side members, each having a vertical housing and bracket members in front of and in the rear of the housing, a bowed bar secured at its ends to the said front bracket members, a bracket on said bar at the center of the front of said bar, said last mentioned bracket having a ledge at the back thereof beneath said bar, a wheel on said bracket, and wheels on the said rear bracket members.

2. An automobile jack including a wheeled pedestal, a transverse bar on the pedestal at the rear, vertical thrust screws mounted to turn in said pedestal at the sides adjacent to the ends of said bar, bevel pinions threaded on said screws and held against vertical movement, sleeves loose on the said bar, pinions on the sleeves in mesh with the first-mentioned pinions, drive pinions on the sleeves at the inner ends, a lever including a yoke hung on the said bar between the said sleeves, and pawls on the said lever engageable with the drive pinions to turn the same.

3. An automobile jack comprising a pedestal, vertical thrust screws in said pedestal at the sides, said screws having like threads, pinions threaded on said screws and held against vertical movement, and means to turn said pinions, said means including drive pinions, connections between said drive pinions and the first-mentioned pinions, a lever mounted to vibrate vertically on a transverse axis, pawls rockably mounted on the lever adjacent to the drive pinions and each having arms disposed respectviely above and below the axis of the drive pinions, and means to separately rock the pinions on their axes to engage either arm of a pawl with its respective drive pinion.

4. An automobile jack including a pedestal, vertical thrust screws in said pedestal at the sides, operating means for said screws and means controlling said operating means and variable to cause the same to turn the screws in either direction simultaneously, in opposite directions, or to optionally actuate either of said screws.

5. An automobile jack including a pedestal, thrust screws vertically movable in the pedestal at the sides, bevel pinions threaded on the said screws and held against traveling movement, a transverse rod on said pedestal, sleeves on said rod near the ends, bevel pinions rigid with the sleeves and in mesh with the first-mentioned pinions, drive pinions rigid with the sleeves at the opposite ends, a lever vibratable on the said rod between the sleeves, and pawls on said lever to vibrate therewith and engageable with the said drive pinions.

6. An automobile jack comprising a pedestal, thrust screws vertically movable in the pedestal at the sides thereof, pinions threaded on the screws and held against traveling movement thereon, means to turn said pinions, said means including drive pinions, a lever mounted on the pedestal to vibrate vertically on a transverse axis, pawls presenting upper and lower arms and rockably mounted on the lever between said arms adjacent to the said drive pinions, each of said pawls presenting beveled faces at an angle to each other, and spring-pressed means engageable by either of the beveled faces of the pawls to dispose the pawls with either arm thereof in engagement with the respective drive pinions.

7. An automobile jack comprising a pedestal, thrust screws vertically movable in the pedestal at the sides thereof, pinions threaded on the screws and held against traveling movement thereon, means to turn said pinions, said means including drive pinions, a two-armed yoke provided with a lever handle and hung on the pedestal to vibrate vertically on a transverse axis, pawls presenting upper and lower arms and rockably mounted on the lever between said arms adjacent to the said drive pinions, each of said pawls presenting beveled faces at an angle to each other, rods longitudinally movable on said yoke and connected with the pawls to rock the same for disposing the respective arms of the pawls for engagement with the drive pinions, and spring-pressed elements on the yoke and yieldingly pressing against the pawls at the said beveled faces, the said elements having depressions in the faces thereof to engage said faces of the pawls with the latter in a neutral position or with either arm of the respective pawls in engagement with the pinion.

In testimony whereof we have signed our names to this specification in the presence of two subscribing witnesses.

FRED ORLANDO COOLEY.
ALFRED JAMES MILLIGAN.

Witnesses:
A. H. SCHRASS,
M. F. LILLJANDER.

Copies of this patent may be obtained for five cents each, by addressing the "Commissioner of Patents, Washington, D. C."